US010240000B2

(12) United States Patent
Avakian et al.

(10) Patent No.: US 10,240,000 B2
(45) Date of Patent: Mar. 26, 2019

(54) AROMATIC POLYIMIDES SUITABLE FOR 3D PRINTING PROCESSES

(71) Applicants: POLYONE CORPORATION, Avon Lake, OH (US); THE UNITED STATES OF AMERICA as represented by THE ADMINISTRATOR OF THE NATIONAL AERONAUTICS AND SPACE ADMINISTRATION, Washington, DC (US)

(72) Inventors: Roger W. Avakian, Solon, OH (US); Ling Hu, Westlake, OH (US); Chun-Hua Chuang, Brecksville, OH (US)

(73) Assignees: PolyOne Corporation, Avon Lake, OH (US); The Unted States of America as represented by The Administrator of the National Aeronautics and Space Administrations, Washington, DC (US)

( * ) Notice: Subject to any disclaimer, the term of this patent is extended or adjusted under 35 U.S.C. 154(b) by 0 days.

(21) Appl. No.: 15/024,838

(22) PCT Filed: Sep. 24, 2014

(86) PCT No.: PCT/US2014/057123
§ 371 (c)(1),
(2) Date: Mar. 24, 2016

(87) PCT Pub. No.: WO2015/048071
PCT Pub. Date: Apr. 2, 2015

(65) Prior Publication Data
US 2016/0215096 A1 Jul. 28, 2016

Related U.S. Application Data

(60) Provisional application No. 61/882,832, filed on Sep. 26, 2013.

(51) Int. Cl.
*C08G 73/10* (2006.01)
*C08J 5/04* (2006.01)
(Continued)

(52) U.S. Cl.
CPC ...... *C08G 73/1067* (2013.01); *B29C 47/0004* (2013.01); *C08G 73/105* (2013.01);
(Continued)

(58) Field of Classification Search
USPC .......................................... 528/289; 524/600
See application file for complete search history.

(56) References Cited

U.S. PATENT DOCUMENTS 4,011,198 A    3/1977   Takekoshi et al.
4,294,976 A   10/1981   Itatani et al.
(Continued)

FOREIGN PATENT DOCUMENTS

CN           102199290 A        9/2011

OTHER PUBLICATIONS

Chuang et al., "Evaluation of RTM370 Polyimide Composites by Resin Film Infusion (RFI)," SAMPE Proceedings, Jun. 2014.
(Continued)

*Primary Examiner* — Tae H Yoon
(74) *Attorney, Agent, or Firm* — John H. Hornickel

(57) ABSTRACT

Novel aromatic polyimides are disclosed with sufficient physical properties to be useful in 3D printing.

14 Claims, 1 Drawing Sheet

(51) Int. Cl.
*C08K 7/06* (2006.01)
*C08J 5/24* (2006.01)
*B29C 47/00* (2006.01)
*C09D 179/08* (2006.01)

(52) U.S. Cl.
CPC ..... *C08G 73/1014* (2013.01); *C08G 73/1028* (2013.01); *C08G 73/1071* (2013.01); *C08J 5/042* (2013.01); *C08J 5/24* (2013.01); *C08K 7/06* (2013.01); *C09D 179/08* (2013.01); *C08J 2379/08* (2013.01)

(56) References Cited

U.S. PATENT DOCUMENTS

| | | | |
|---|---|---|---|
| 5,708,128 A | 1/1998 | Oikawa et al. | |
| 5,911,932 A | 6/1999 | Dyksterhouse | |
| 5,939,521 A | 8/1999 | Chuang | |
| 6,066,710 A | 5/2000 | Becker et al. | |
| 6,166,174 A * | 12/2000 | Jensen | C08G 73/101 428/411.1 |
| 6,359,107 B1 | 3/2002 | Connell et al. | |
| 6,451,955 B1 * | 9/2002 | Hausladen | C08G 73/1032 525/420 |
| 6,476,182 B1 * | 11/2002 | Auman | C08G 73/1014 528/125 |
| 6,524,690 B1 | 2/2003 | Dyksterhouse | |
| 6,656,316 B1 | 12/2003 | Dyksterhouse | |
| 6,784,276 B1 | 8/2004 | Chuang | |
| 6,958,192 B2 | 10/2005 | Hergenrother et al. | |
| 7,015,304 B1 | 3/2006 | Chuang | |
| 7,297,740 B2 | 11/2007 | Dyksterhouse | |
| 7,381,849 B1 | 6/2008 | Chuang | |
| 7,425,650 B1 | 9/2008 | Chuang | |
| 7,678,443 B2 | 3/2010 | Schulz et al. | |
| 8,037,437 B2 * | 10/2011 | Davis | G06F 17/5031 716/108 |
| 8,093,348 B1 | 1/2012 | Chuang | |
| RE43,880 E | 12/2012 | Chuang | |
| 8,784,719 B2 | 7/2014 | Lingannaiah et al. | |
| 8,868,202 B2 * | 10/2014 | Della Santina | A61N 1/36 607/119 |
| 9,052,654 B2 * | 6/2015 | Sonobe | C08G 73/1067 |
| 9,227,366 B2 | 1/2016 | Giller | |
| 2003/0045669 A1 * | 3/2003 | Tsuji | C08G 73/10 528/170 |
| 2006/0148963 A1 | 7/2006 | Dion et al. | |
| 2009/0242823 A1 | 10/2009 | Kanakarajan et al. | |
| 2013/0029154 A1 | 1/2013 | Roach | |
| 2014/0135447 A1 | 5/2014 | Golba et al. | |
| 2014/0272358 A1 * | 9/2014 | Meador | C08J 9/00 428/219 |
| 2016/0096324 A1 | 4/2016 | Giller | |
| 2016/0215095 A1 | 7/2016 | Avakian et al. | |

OTHER PUBLICATIONS

Chuang et al., "Composite Properties of RTM370 Polyimide Fabricated by VARTM," SAMPE, May 2011.
Chuang et al., "Polyimides Based on Asymmetric Dianhydrides (II) (a-BPDA vs a-BTDA) for Resin Transfer Molding (RTM)," NASA Technical Reports Server (NTRS), May 2010, Report No. E-17516, pp. 1-12.
Hergenrother et al., "Phenylethynyl Containing Imide Oligomers," Polymer, 2000, vol. 41, No. 13, pp. 5073-5081.
Purushothaman et al., "Effect of Chemical Structure of Aromatic Dianhydrides on the Thermal, Mechanical and Electrical Properties of Their Terpolyimides with 4,4'-Oxydianiline," Journal of Polymer Research, 2011, vol. 818, No. 6, pp. 1597-1604.
Lu et al., "Preparation and Properties of T300 Carbon Fiber-Reinforced Thermoplastic Polyimide Composites," Journal of Applied Polymer Science, 2006, vol. 102, pp. 646-654.
Preparation and properties of T300 carbon fiber reinforced thermoplastic polyimide composites, J. Appl. Polym. Sci., vol. 102, 646-654 (2006).
Machine translation of CN102199290A dated Sep. 28, 2011 (12 pages).
Dorsey et al., Structure and Properties of Melt-Extruded LaRC-IA (3,4'-ODA 4,4'-ODPA) Polyimide Fibers, Journal of Applied Polymer Science, vol. 73, 1215-1222 (1999).
Shi et al., Thermo-processable polyimides with high thermo-oxidative stability as derived from oxydiphthalic anhydride and bisphenol A type dianhydride, High Perform. Polym. 12 (2000) 377-393, printed in the UK (2000 IPO Publishing Ltd.).
Hu et al., Synthesis and the structure-property of transparent polyimide films prepared by fluorinated monomers for flexible substrates applications (Aug. 2011).
Cano et al., Effect of Molecular Weight on Processing and Adhesive Properties of the Phenylethynyl-Terminated Polyimide LARC™-PETI-5, The Journal of Adhesion, 60:1-4, 113-123, DOI: 10.1080/00218469708014413 (1997) published online Sep. 24, 2006.

* cited by examiner

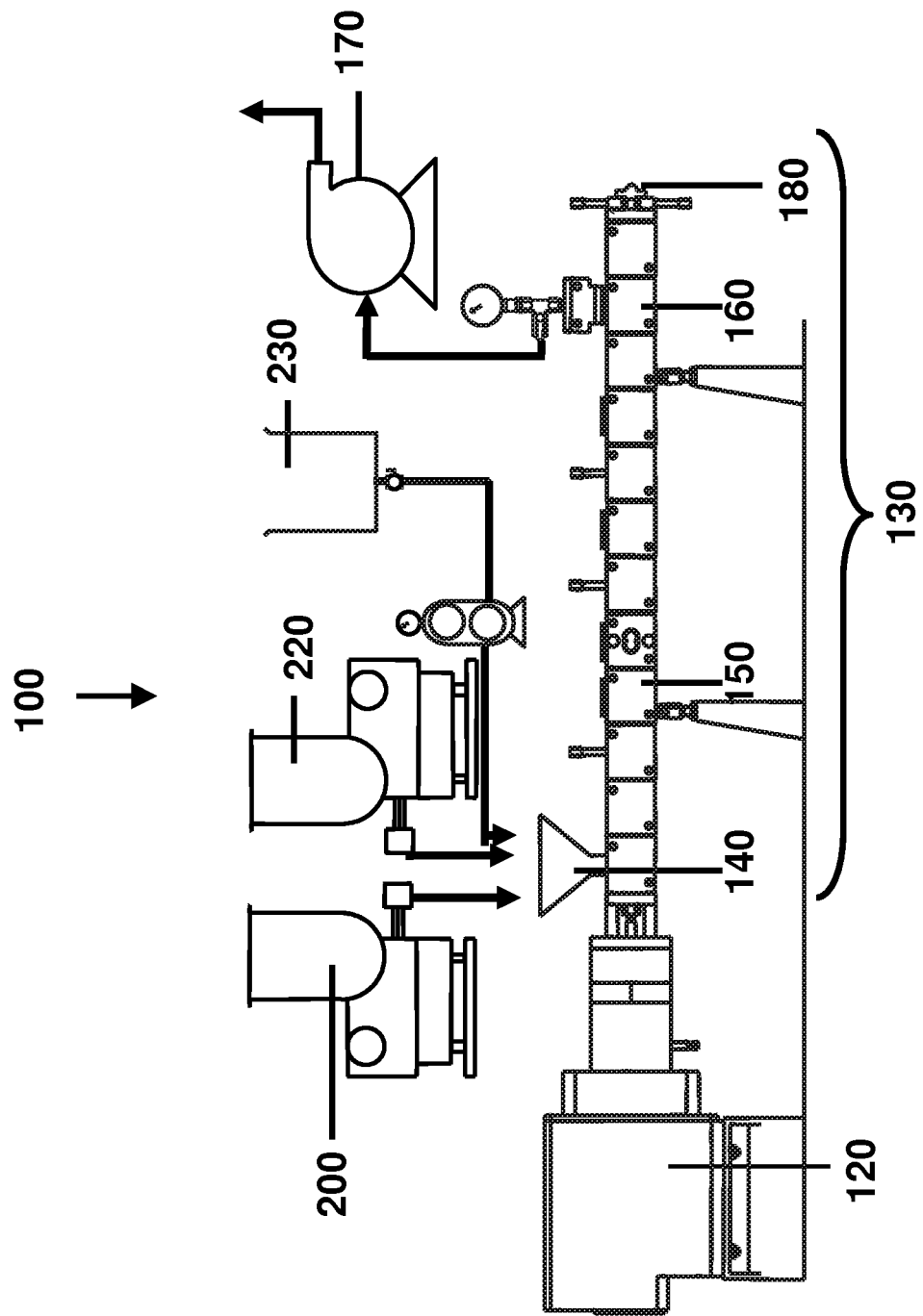

US 10,240,000 B2

AROMATIC POLYIMIDES SUITABLE FOR 3D PRINTING PROCESSES

CLAIM OF PRIORITY

This application claims priority from U.S. Provisional Patent Application Ser. No. 61/882,832 filed on Sep. 26, 2013, which is incorporated by reference.

GOVERNMENT LICENSE RIGHTS

The invention described herein was made in performance of work under NASA Cooperative Agreement No. NNX12AP27A and is subject to the provisions of Section 20135 of the National Aeronautics and Space Act (51 U.S.C. 20135).

FIELD OF THE INVENTION

This invention concerns the production of new aromatic polyimides suitable for use in the manufacture of thermoplastic polymer articles via 3D printing, also known as "additive manufacturing" or "fused deposition modeling".

BACKGROUND OF THE INVENTION

High performance imide polymers are characterized by excellent thermal stability, solvent resistance and high glass transition temperatures (Tg). U.S. Pat. No. 7,015,304 and RE43,880 (both Chuang), the disclosures of which are incorporated by reference, disclose the preparation by a batch process of solvent-free, low-melt imide oligomers and thermosetting polyimides, and to the process of preparing such oligomers and polyimides.

U.S. Pat. No. 6,066,710 (Becker et al.) discloses an extrusion process for making aromatic polyimides from symmetrical dianhydrides.

Also U.S. Pat. No. 8,093,348 (Chuang), the disclosure of which is incorporated by reference, discloses a variety of starting asymmetric dianhydride monomers, diamine monomers, and endcap monomers useful for making aromatic polyimide polymers.

None of these prior efforts has addressed the particular and peculiar requirements for polymerizing monomers to yield new aromatic polyimides which are suitable for use in 3D printing.

3D printing (also known by the other phrases identified above) is being hailed in the polymer industry as a new means of forming shaped polymeric articles, literally from the ground up. Like soldering, a space is filled by a material coming from a filamentary form and being heated for delivery precisely to the x-y-z coordinates of that space. A lattice or scaffold of supporting material is also often delivered to adjoining spaces in the same precise manner to fortify the polymeric material of the shaped, printed article until that polymeric material sufficiently cools to provide a final rigid structure in the desired shape, which can be separated from the supporting material.

The polymeric material considered for use in 3D printing has included customary semi-crystalline polymers but has recently also focused on polymer resins and blends of polymer resins which have high temperature performance properties. Aromatic polyimide has been considered a candidate for use in 3D printing.

SUMMARY OF THE INVENTION

What the art needs is an aromatic polyimide having a Tg greater than about 220° C. which is sufficiently ductile that it can be formed into a filament having a diameter ranging from about 1.6 to about 2.1 mm and preferably from about 1.74 to about 1.86 mm and sufficiently flexible that such filament can be wound about a core having a diameter of from about 15 cm to about 25 cm and preferably from about 19 cm to about 22 cm.

Stated another way, the aromatic polyimide needs to be sufficiently ductile and flexible that filament of the diameters identified above can form a loop of about 64 cm (25.13 inches) in circumference.

Stated another way, the aromatic polyimide having a high Tg needs to be sufficiently ductile and flexible that filament of the diameters identified above in a length of about 38 cm (15 inches) can be bent upon itself, such that the opposing ends of that length of filament can touch each other.

Thus, by any of these three means of expression, aromatic polyimides having high Tg values in excess of 220° C. and preferably in excess of 250° C. can be included in the cadre of resins available for the emerging industry of 3D printing of articles using polymers.

The present invention has made 3D printing for high Tg resins possible by synthesizing new aromatic polyimides which are both tough enough to be made into a 3D printing filament of the diameter described above and also flexible enough to be wound about a spool for delivery of the filament to the location of a 3D printing head.

None of the prior art identified above arose in the time when the particularities of 3D printing were truly understood, particularly for high temperature polymers which have melting temperatures hotter than a pizza oven.

The present invention utilizes a particular combination of monomers: (a) an asymmetric dianhydride; in reaction with (b) one or more aromatic diamines; while being subjected to a competing reaction with (c) a mono-anhydride capable of capping the end(s) of the growing polyimide polymer chains.

Unfortunately, preparation of high performance imide polymers involve difficult reactions and can benefit from reactive extrusion, a continuous process with timed introduction of the ingredients to form the imide oligomer taught in U.S. Pat. No. 7,015,304 and RE43,880 (both Chuang).

But Chuang did not recognize the particular properties necessary for making the high Tg polymer into filaments to be wound upon a spool for 3D printing. Hence, this invention involves synthesis of new polymers.

Controlled preparation of high performance imide polymers via reactive extrusion was identified in PCT Patent Publication WO 2013/006621 (Golba et al.), in a manner by which the endcap was to be introduced into the extruder at a zone downstream from the throat and the mixing zone of the extruder.

Unexpectedly, as an alternative to Golba et al., it has been found in the present invention that all ingredients, including the endcap, can be added at the throat of the extruder, establishing the competition for the diamine reaction sites between the dianhydride and the endcap from the beginning of the extrusion process.

One aspect of the invention is an aromatic polyimide selected from the group consisting of:
(a) Poly (2-{4-[3-(1,3-dioxo-2,3-dihydro-1H-isoindol-2-yl)phenoxy]phenyl}-5-(2-{3-[4-(1,3-dioxo-2,3-dihydro-1H-isoindol-2-yl)phenoxy]phenyl}-1,3-dioxo-2,3-dihydro-1H-isoindol-4-yl)-2,3-dihydro-1H-isoindole-1,3-dione);
(b) Poly (5-{2-[3-(4-{5-[2-(4-{3-[4-(1,3-dioxo-2,3-dihydro-1H-isoindol-2-yl)phenoxy]phenyl)-1,3-dioxo-2,3-dihydro-1H-isoindol-4-yl]-1,3-dioxo-2,3-dihydro-1H-isoindol-2-yl}phenoxy)phenyl]-1,3-dioxo-2,3- dihydro-1H-isoindol-4-yl}-2-{4-[3-(1,3-dioxo-2,3-dihydro-1H-isoindol-2-yl)phenoxy]phenyl}-2,3-dihydro-1H-isoindole-1,3-dione);

(c) Poly (2-{4-[3-(1,3-dioxo-2,3-dihydro-1H-isoindol-2-yl) phenoxy]phenyl}-5-[2-(3-{4-[5-(2-{4-[4-(2-{4-[4-(1,3-dioxo-2,3-dihydro-1H-isoindol-2-yl)phenoxy] phenyl}propan-2-yl)phenoxy]phenyl}-1,3-dioxo-2,3-dihydro-1H-isoindol-4-yl)-1,3-dioxo-2,3-dihydro-1H-isoindol-2-yl]phenoxy}phenyl)-1,3-dioxo-2,3-dihydro-1H-isoindol-4-yl]-2,3-dihydro-1H-isoindole-1,3-dione);

(d) Poly (2-{4-[3-(1,3-dioxo-2,3-dihydro-1H-isoindol-2-yl) phenoxy]phenyl}-5-[2-(3-{4-[5-(2-{4-[2-(3-{2-[4-(1,3-dioxo-2,3-dihydro-1H-isoindol-2-yl)phenyl]propan-2-yl}phenyl)propan-2-yl]phenyl}-1,3-dioxo-2,3-dihydro-1H-isoindol-4-yl)-1,3-dioxo-2,3-dihydro-1H-isoindol-2-yl]phenoxy}phenyl)-1,3-dioxo-2,3-dihydro-1H-isoindol-4-yl]-2,3-dihydro-1H-isoindole-1,3-dione); and (e) combinations thereof.

Another aspect of the present invention is an aromatic polyimide selected from the group consisting of:

(a) the reaction product of (1) 3,4'-oxydianiline (3,4' ODA); (2) 2,3,3',4'-biphenyldianhydride (a-BPDA); and (3) phthalic anhydride in a molar ratio of 1.0:0.975-0.985:0.03-0.05;

(b) the reaction product of (1) 3,4'-oxydianiline (3,4' ODA); (2) 1,3-Bis(4-aminophenoxy)benzene (1,3,4'-APB); (3) 2,3,3',4'-biphenyldianhydride (a-BPDA); and (4) phthalic anhydride in a molar ratio of 0.9:0.1:0.975-0.98: 0.04-0.05;

(c) the reaction product of (1) 3,4'-oxydianiline (3,4' ODA); (2) 2,2-Bis(4-[4-aminophenoxy]phenyl)propane (BAPP); (3) 2,3,3',4'-biphenyldianhydride (a-BPDA); and (4) phthalic anhydride in a molar ratio of 0.9:0.1:0.975:0.05; and (d) the reaction product of (1) 3, 4'-oxydianiline (3,4' ODA); (2) 4,4'-[1,3-phenylenebis(1-methyl-ethylidene) bisaniline (Bisaniline-M); (3) 2,3,3',4'-biphenyldianhydride (a-BPDA); and (4) phthalic anhydride in a molar ratio of 0.9:0.1:0.975:0.05; and combinations thereof.

Another aspect of the present invention is an aromatic polyimide comprising (a) 3, 4'-oxydianiline (3,4' ODA) monomer; (b) 2,3,3',4'-biphenyldianhydride (a-BPDA) monomer; and (c) phthalic anhydride monomer at a molar ratio sufficient to produce the aromatic polyimide having a glass transition temperature of more than 220° C. and ductility to be wound in the form of a filament of about 2 mm diameter around a spool having a diameter of 8 inches (20.32 cm).

Embodiments of the invention are explained with reference to the drawing.

BRIEF DESCRIPTION OF THE DRAWING

FIG. 1 is a schematic view of the reactive extrusion process of the invention.

EMBODIMENTS OF THE INVENTION

Ingredients for Preparing the High Temperature Polyimides

Table 1 shows the ingredients used to prepare the novel polyimides. The amount of endcap determines the molecular weight of the resulting aromatic polyimide because the endcap competes with the asymmetric dianhydride for reaction sites at the diamine(s). It has been found that to synthesize filament-quality polyimide, the amount of phthalic anhydride endcap should be less than about 2 mole percent of reactant.

TABLE 1

| Brand Name | Ingredient | Formula |
|---|---|---|
| Diamines | | |
| 3,4' ODA | 3,4'-oxydianiline, Mw = 200.24, Tm = 74~75° C., CAS No. 2657-87-6 | 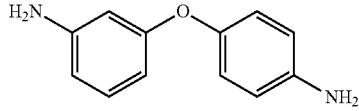 |
| 1,3,4'-APB | 1,3-Bis(4-aminophenoxy)benzene, Mw = 292.3, Tm = 116° C., CAS No. 2479-46-1 | 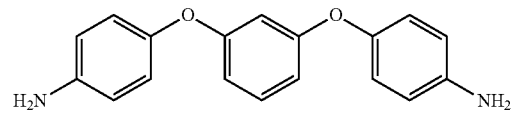 [SMILES: Nc1ccc(Oc2cccc(Oc3ccc(N)cc3)c2)cc1] |
| BAPP | 2,2-Bis(4-[4-aminophenoxy]phenyl)propane, Mw = 410.5, Tm = 128° C., CAS No. 13080-86-9 | 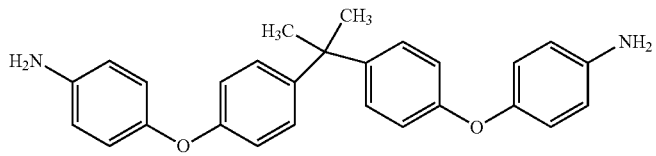 [SMILES: CC(C)(c1ccc(Oc2ccc(N)cc2)cc1)c1ccc(Oc2ccc(N)cc2)cc1] |
| Bisaniline-M | 4,4'-[1,3-phenylenebis(1-methyl-ethylidene)bisaniline, Mw = 344.5, Tm = 110-114° C., CAS No. 2687-27-6 | 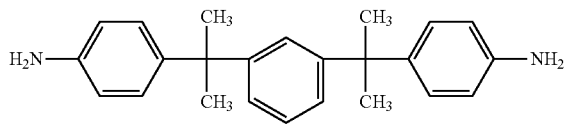 [SMILES: CC(C)(c1ccc(N)cc1)c1cccc(C(C)(C)c2ccc(N)cc2)c1] |

TABLE 1-continued

| Brand Name | Ingredient | Formula |
|---|---|---|
| Asymmetric Dianhydride | | |
| a-BPDA | 2,3,3',4'-Biphenyltetracarboxylic dianhydride, CAS No. 36978-41-3 Mw = 294.21, Tm = 196 to 197° C. | |
| Endcap | | |
| PA | Phthalic anhydride, MW = 148.12 (Tm = 131~134° C., and Tb = 284° C.) (CAS: 85-44-9) | |

This invention allows for the option of using multiple diamines in the polymerization of the polyimide, so long as one of the diamines is 3,4' ODA. As seen in the chart above, the second diamine used can be any of 1,3,4'-APB, BAPP, or Bisaniline-M.

But not 1,3,-Bis(3-aminophenoxy)benzene, also known as 1,3,3'-APB.

In a totally unpredictable manner, with confirmation of the experimental results, it was found that (and reported in the Examples below) that use of 1,3,-Bis(3-aminophenoxy) benzene (1,3,3' APB) as a second diamine was a failure at synthesizing an acceptable polyimide via reactive extrusion. The result of the attempt was a material that was too viscous to be able to flow in the extruder, even when the processing temperatures in the zones were increased to the maximum of the extruder, 400° C. It was observed when the extruder was opened for cleaning that the material had become adhered to the barrel of the extruder.

It is not known why 1,3,3'-APB fails while 1,3,4'-APB succeeds. A comparison of the two formulae shows how subtle and unpredictable the difference is between success and failure:

1,3,3'-APB:

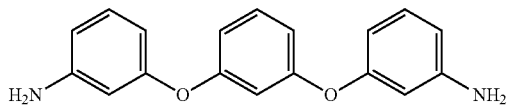 [SMILES: Nc1cccc(Oc2cccc(Oc3cccc(N)c3)c2)c1]

1,3,4'-APB:

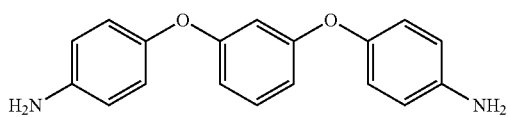 [SMILES: Nc1ccc(Oc2cccc(Oc3ccc(N)cc3)c2)cc1]

The orientation of the phenyl linkages between the benzene rings, relative to the orientation of the amine groups on the end benzene rings is the only difference. The meta position fails; the para position succeeds.

For this reason, it is not presently possible for one having ordinary skill in the art to predict which combination of asymmetric dianhydride, diamine(s), and endcap will result in a new polyimide resin with sufficient ductile and flexible strength to be formed into a filament and wound upon a spool of conventional size for use in 3D printing.

Concurrent or Sequential Reactive Extrusion

One method of reaction is the contact of the endcap with the diamine concurrent with the contact of the dianhydride with the diamine, in order to establish a competition for diamine reaction sites as soon as melting has commenced in the upstream zones of an extruder. The melt-mixing of the dianhydride and the diamine can result in suitable reaction, even while the endcap is also competing for reaction with the diamine(s) in the extruder.

FIG. 1 provides a schematic view of the reactive extrusion method useful for the polyimide.

Alternatively, as explained in Golba et al., a second method of reaction can be the delayed addition of endcap in a later zone, such as the fourth zone, allowing the dianhydride and the diamine(s) to melt and commence reaction before introduction of the endcap commences competition for the diamine reaction sites.

The process can be based on the use of an extruder 100 having a source of power 120 and a series of heated zones 130 through which ingredients travel in a molten state. The extruder can be a twin screw extruder, either co-rotating or counter-rotating and have a screw diameter ranging from 16 mm to 45 mm.

The series of heated zones 130 can number more than six and usually eight or nine, allowing the establishment of different temperatures associated with different segments of screws (not shown) propelling the molten ingredients through the extruder and encountering other ingredients in conditions ripe for planned reaction. FIG. 1 shows twelve zones 130 for extruder 100.

Among the series of zones is a first unheated or cooled zone or throat 140 of the extruder, into which all of the ingredients are added. In the alternative approach, sequential reactive extrusion, a subsequent or downstream zone 150 contains a port for injection of at least one other ingredient. After the last ingredient(s) is(are) added at zone 150, regardless of concurrent or sequential technique, further melt-mixing and planned reaction occur, until an evacuation zone 160 is reached further downstream. Zone 160 can be connected to a source of vacuum power 170 to vent any volatiles, such as water or steam. The melted, mixed, and reacted product of the extruder 100 is extruded through a die 180, for further processing such as pelletizing for later melt-mixing or reaction.

Alternatively, directly for 3D printing, the die 180 can be of a diameter to yield filaments of a diameter of from about 1.6 to about 2.1 mm and preferably from about 1.7 mm to about 1.9 mm, and the extrudate can be wound directly upon the spool for later use in the 3D printing in any shape conceivable in three dimensional space.

In the present invention, the reactive extruder 100 can be configured to have a first feeder 200, a second feeder 220, and a third feeder 230 to introduce the dianhydride, the diamine, and the endcap, respectively, into the throat 140, commencing the journey through the extruder in which the early or upstream zones are heated to melt all three or more ingredients and to facilitate a reaction among them.

At the throat, shown as 140 in FIG. 1, the endcap can be introduced via third feeder 230 even before the dianhydride and the diamine to have begun reacting. The endcap can be a solid or a liquid, preferably, the latter to assist in the competition of reacting with the diamine while the dianhydride also is reacting with the diamine. In the alternative, sequential technique, the feeder 230 delivers the endcap at a downstream zone 150.

The reaction temperature, as reported by Chuang for a batch process, can range from about 232° to about 280° C.

However, in this invention, it has been found that each of the zones of the reactive extruder should be heated to a temperature within the range of 320° C. to 400° C. Conventionally, the temperature remains the same or increases for the sequential zones, until the die zone 180, at which the same or slightly lower temperature prepares the extrudate for exit from the extruder and cooling into strands, pellets, etc.

Those persons having ordinary skill in the art of reactive extrusion, without undue experimentation, can select the appropriate temperatures for the zones within the 320° C. to 400° C. range identified above, as a result of review of the Examples below. Also, those same persons, without undue experimentation, can establish screw rotation revolutions per minute to establish the time of transit through each zone of the extruder 100, which can be a factor in the kinetics of the reactive extrusion planned for the dianhydride and diamine in the concurrent or sequential presence of the monoanhydride endcap which is reactive with the diamine(s) but non-reactive thereafter.

Usefulness of the Invention

The specific polyimides synthesized according to this invention are engineered for use in the 3D printing technique of plastic article shaping. Simple or complex shapes can be printed digitally relying upon the x-y-z coordinates of space and computer software to drive the printer using filaments of the polyimides of this invention to melt, deposit, and cool layer-by-layer in the z axis above the x-y plane to build any conceivable three-dimensional polyimide object.

Combining the emerging technique of 3D printing with the high temperature performance of polyimide is a tremendous combination of manufacturing processing and end-use performance not previously achieved. 3D printed polymer articles can be of any form or shape conceivable, even a Möbius strip.

Composites of the polyimides of this invention with other ingredients added for functional purposes can be used in a number of high performance articles, such as lightweight polymer composites (e.g., airframe and engine components); military and commercial aircraft; missiles, radomes, and rockets, etc.; high temperature laminates; electrical transformers; bushings/bearings for engines; oil drilling equipment; oil drilling risers; automotive chassis bearings; and films for use in electronics, fuel cells and batteries.

The new production of composites begins with the solvent-less reactive extrusion process described above, which has resulted in polyimide in the form of dry powders, pellets, filaments, films, etc. The production utilizes powder or pellets of the polyimide to be fed as solid articles into a single screw extruder with an appropriate film or sheet extrusion die and operating at temperatures above the melting point of the polyimide. The extruder would rapidly melt the dry polymer to produce a thin film emerging from the die.

It is also possible to include carbon, glass, or synthetic fibers as additives in the reactive extrusion to form the aromatic polyimide.

It is also possible for the polyimide being reactively extruded to be extruded using a sheet or film die in the melt form directly onto fibers (woven or nonwoven) for cooling and subsequent use.

Examples further explain the invention.

EXAMPLES

Table 2 shows the acceptable, desirable, and preferable molar ratio ranges of the monomers useful for synthesizing the polyimides. The polyimide can comprise, consist essentially of, or consist of these monomers. The monomers can be introduced separately into the throat of the extruder as seen in FIG. 1 or pre-blended before addition via a single feeder.

TABLE 2

| Molar Ratios | Acceptable | Desirable | Preferable |
| --- | --- | --- | --- |
| Diamine(s) | 1.0 | 1.0 | 1.0 |
| Asymmetric Dianhydride | 0.88-0.98 | 0.97-0.98 | 0.97-0.98 |
| Endcap | 0.03-0.24 | 0.04-0.05 | 0.05 |

Table 3 shows the ingredients used for the Examples and the Comparative Example. Tables 4-6 show the molar ratios of the ingredients, the extrusion reaction conditions, and the results.

TABLE 3

| Brand Name | Ingredient and Purpose | Commercial Source |
| --- | --- | --- |
| 3, 4' ODA | 3, 4'-oxydianiline, Mw = 200.24, Tm = 74~75° C. | Miki Sanyo (USA) Inc. |
| 1,3,4'-APB | 1,3-Bis(4-aminophenoxy)benzene, Mw = 292.3, Tm = 116° C. | Miki Sanyo (USA) Inc. |
| 1,3,3'-APB | 1,3,-Bis(3-aminophenoxy)benzene, Mw = 292.3, Tm = 106.5-110° C. | Miki Sanyo (USA) Inc. |
| BAPP | 2,2-Bis(4-[4-aminophenoxylphenyl)propane, Mw = 410.5, Tm = 128° C. | Mitsui Chemical |
| Bisaniline-M | 4,4'-[1,3-phenylenebis(1-methyl-ethylidene)bisaniline, Mw = 344.5, Tm = 110-114° C. | Mitsui Chemical |
| a-BPDA | 2,3,3',4'-Biphenyltetracarboxylic dianhydride, CAS No. 36978-41-3 Mw = 294.21, Tm = 196 to 197° C. | Miki Sanyo (USA) Inc. |
| PA | Phthalic anhydride, MW = 148.12 (Tm = 131~134° C., and Tb = 284° C.) (CAS: 85-44-9) | Sigma Aldrich |
| STABILIZER | IRGAFOS P-EPQ FF | BASF |

TABLE 4

| | Example | | | | | | |
|---|---|---|---|---|---|---|---|
| | A | B | C | D | E | F | G |
| | Mole ratio of Diamine(s):a-BPDA:PA | | | | | | |
| | 1:0.95:0.1 | 1:0.88:0.24 | 1:0.88:0.24 | 1:0.88:0.24 | 1:0.9:0.2 | 1::0.92:0.16 | 1:0.9:0.2 |
| | Monomers (Mole %) | | | | | | |
| 3,4'-ODA | 48.78 | 47.17 | 47.17 | 47.17 | 47.62 | 48.08 | 47.62 |
| 1,3,4'-APB | | | | | | | |
| 1,3,3'-APB | | | | | | | |
| BAPP | | | | | | | |
| Bisaniline-M | | | | | | | |
| a-BPDA | 46.34 | 41.51 | 41.51 | 41.51 | 42.86 | 44.23 | 42.86 |
| PA | 4.88 | 11.32 | 11.32 | 11.32 | 9.52 | 7.69 | 9.52 |
| Stabilizer, Irgafos P-PEPQ FF, wt % in total formulation | 0 | 0.1 | 0.1 | 0 | 0 | 0 | 0 |
| Extruder | Prism 16 millimeter Twin Screw Extruder | | | | | | |
| Order of addition | All ingredients added at throat | | | | | | |
| | Temperature at different zones, ° C. | | | | | | |
| Zone 1 | n/a | 280 | 280 | 280 | 280 | 280 | 300 |
| Zone 2 | 100 | 280 | 280 | 280 | 280 | 280 | 300 |
| Zone 3 | 220 | 320 | 320 | 320 | 320 | 320 | 350 |
| Zone 4 | 220 | 320 | 320 | 320 | 320 | 320 | 350 |
| Zone 5 | 220 | 350 | 350 | 350 | 350 | 350 | 350 |
| Zone 6 | 230 | 350 | 350 | 350 | 350 | 350 | 370 |
| Zone 7 | 230 | 350 | 350 | 350 | 350 | 350 | 370 |
| Zone 8 (vacuum port) | 230 | 350 | 350 | 350 | 350 | 350 | 370 |
| Zone 9 | 230 | 350 | 350 | 350 | 350 | 350 | 380 |
| Die | 230 | None | 370 | 370 | 340 | 340 | 380 |
| Screw rpm | 250 | 300 | 300 | 300 | 300 | 300 | 250~300 |
| Observation at Die | Failure | Molten strand but brittle when cooled. | Molten strand but brittle when cooled. | Molten strand but brittle when cooled. | Molten strand but brittle when cooled. | Molten strand but brittle when cooled. | Molten strand but brittle when cooled. |
| Tg measured by DSC, ° C. | Not tested | Not tested | Not tested | 245 | 243 | 236.2 | 240.95 |
| Mn by GPC | Not tested | Not tested | Not tested | Not tested | Not tested | Not tested | 5601 |
| Mw by GPC | Not tested | Not tested | Not tested | Not tested | Not tested | Not tested | 8779 |
| Mw/Mn | Not tested | Not tested | Not tested | Not tested | Not tested | Not tested | 1.567 |
| Filament possibility | No | No | No | No | No | No | No |

TABLE 5

| | Example | | | | | |
|---|---|---|---|---|---|---|
| | H | 1 | 2 | 3 | I | 4 | 5 |
| | Mole ratio of Diamine(s):a-BPDA:PA | | | | | | |
| | 1:0.95:0.1 | 1:0.975:0.05 | 1:0.985:0.03 | 0.9:0.1:0.975:0.05 | 0.9:0.1:0.975:0.05 | 0.9:0.1:0.975:0.05 | 0.9:0.1:0.975:0.05 |
| | Monomers (Mole %) | | | | | | |
| 3,4'-ODA | 48.78 | 49.38 | 49.63 | 44.44 | 44.44 | 44.44 | 44.44 |
| 1,3,4'-APB | | | | | | 4.94 | |
| 1,3,3'-APB | | | | | 4.94 | | |
| BAPP | | | | 4.94 | | | |
| Bisaniline-M | | | | | | | 4.94 |
| a-BPDA | 46.34 | 48.15 | 48.88 | 48.15 | 48.15 | 48.15 | 48.15 |
| PA | 4.88 | 2.47 | 1.49 | 2.47 | 2.47 | 2.47 | 2.47 |
| Extruder | Prism 16 millimeter Twin Screw Extruder | | | | | | |
| Order of addition | All ingredients added at throat | | | | | | |
| | Temperature at different zones, ° C. | | | | | | |
| Zone 1 | 320 | 350 | 360 | 300 | 300 | 350 | 350 |
| Zone 2 | 350 | 370 | 360 | 300 | 300 | 350 | 350 |
| Zone 3 | 350 | 370 | 370 | 320 | 320 | 350 | 350 |
| Zone 4 | 350 | 370 | 370 | 320 | 320 | 350 | 350 |
| Zone 5 | 370 | 370 | 370 | 320 | 320 | 350 | 350 |
| Zone 6 | 370 | 370 | 380 | 350 | 350 | 350 | 350 |
| Zone 7 | 370 | 370 | 380 | 350 | 350 | 350 | 350 |

TABLE 5-continued

| | Example | | | | | | |
|---|---|---|---|---|---|---|---|
| | H | 1 | 2 | 3 | I | 4 | 5 |
| | Mole ratio of Diamine(s):a-BPDA:PA | | | | | | |
| | 1:0.95:0.1 | 1:0.975:0.05 | 1:0.985:0.03 | 0.9:0.1:0.975:0.05 | 0.9:0.1:0.975:0.05 | 0.9:0.1:0.975:0.05 | 0.9:0.1:0.975:0.05 |
| Zone 8 (vacuum port) | 380 | 380 | 380 | 350 | 350 | 350 | 330 |
| Zone 9 | 380 | 380 | 380 | 350 | 350 | 350 | 330 |
| Die | 250 | 250 | 150~250 | 350 | 350 | 350 | 330 |
| Screw rpm | 320 | 350 | 360 | 250 | 250 | 250 | 250 |
| Observation at Die | Molten strand but brittle when cooled. | Molten strand and ductile when cooled. | Molten strand and ductile when cooled. | Molten strand and ductile when cooled. | Failure to extrude due to 100% torque | Molten strand and ductile when cooled. | Molten strand and ductile when cooled. |
| Tg measured by DSC, ° C. | 259.1 | 275.3 | 272 | 270.2 | 261.6 | 265.2 | 270.9 |
| Mn by GPC | 9354 | 28090 | not tested | | | | |
| Mw by GPC | 14982 | 38705 | not tested | | | | |
| Mw/Mn | 1.602 | 1.378 | not tested | | | | |
| Filament possibility | No | Yes, Filament Made | Yes, Filament Made | Yes, Filament Made | No | Yes, Filament Made | Yes, Filament Made |

TABLE 6

| | Example | | | | | | |
|---|---|---|---|---|---|---|---|
| | J | K | L | M | 6 | 7 | 8 |
| | Mole ratio of Diamine(s):a-BPDA:PA | | | | | | |
| | 0.5:0.5:0.975:0.05 | 0.75:0.25:0.975:0.05 | 0.75:0.25:0.985:0.03 | 0.85:0.15:0.985:0.03 | 0.9:0.1:0.975:0.05 | 0.9:0.1:0.975:0.05 | 0.9:0.1:0.98:0.04 |
| | Monomers (Mole %) | | | | | | |
| 3,4'-ODA | 24.69 | 37.04 | 37.22 | 42.18 | 44.44 | 44.44 | 44.56 |
| 1,3,4'-APB | 24.69 | 12.35 | 12.41 | 7.45 | 4.94 | 4.94 | 4.95 |
| 1,3,3'-APB | | | | | | | |
| BAPP | | | | | | | |
| Bisaniline-M | | | | | | | |
| a-BPDA | 48.15 | 48.15 | 48.88 | 48.88 | 48.15 | 48.15 | 48.51 |
| PA | 2.47 | 2.47 | 1.49 | 1.49 | 2.47 | 2.47 | 1.98 |
| Extruder | Prism 16 millimeter Twin Screw Extruder | | | | | | |
| Order | All ingredients added at throat | | | | | | |
| | Temperature at different zones, ° C. | | | | | | |
| Zone 1 | 300~360 | 300~380 | 350 | 350~400 | 350 | 350 | 360 |
| Zone 2 | 300~360 | 300~380 | 350 | 350~400 | 350 | 350 | 360 |
| Zone 3 | 300~360 | 320~380 | 350 | 350~400 | 350 | 370 | 360 |
| Zone 4 | 300~360 | 320~380 | 350 | 350~400 | 350 | 370 | 370 |
| Zone 5 | 300~340 | 320~380 | 350 | 350~400 | 350 | 370 | 370 |
| Zone 6 | 300~340 | 320~380 | 350 | 350~400 | 350 | 370 | 370 |
| Zone 7 | 300~340 | 340~380 | 350 | 350~400 | 350 | 370 | 380 |
| Zone 8 (vacuum port) | 300~340 | 340~380 | 350 | 350~400 | 350 | 370 | 380 |
| Zone 9 | 300~320 | 340~380 | 350 | 350~400 | 350 | 380 | 380 |
| Die | 300~320 | 340~380 | 350 | 350~400 | 350 | 380 | 380 |
| Screw rpm | 150~250 | 150~250 | 250 | 400 | 250 | 250 | 250 |
| Observation at Die | Failure to extrude-100% torque | Failure to extrude-100% torque | Failure to extrude-100% torque | Failure to extrude due to 100% torque | Confirms success of Example 4 | Confirms success of Example 4 | Molten strand and ductile when cooled. |
| Tg measured by DSC, ° C. | Not tested | Not tested | Not tested | Not tested | Not tested | Not tested | 262.8~265.2 |
| Mn by GPC | | | | | | | |
| Mw by GPC | | | | | | | |
| Mw/Mn | | | | | | | |
| Filament possibility | No | No | No | No | Yes, Filament Made | Yes, Filament Made | Yes, Filament Made and Used in 3D Printing |

Examples 1-8 differ from Comparative Examples A-M based on the practical result that Examples 1-8 were sufficiently ductile and flexible to be useful as filaments for 3D printing. One test employed was using a length of about 38 cm of strand and gently but firmly bending one end of the strand to touch the other end of the strand without breakage. The more robust test was to wind a strand about a 20.32 cm (8 inches) diameter spool actually used in a commercial 3D printer. Either way, Examples 1-8 were successful among all four new aromatic polyimides based on the molar ratios of monomers, the solvent-less reactive extrusion at the stated temperatures and screw speeds, and the use of a die of a size suitable for commercial filaments useful in 3D printers.

Examples 1-8 identify new polyimides which can have a Tg ranging from about 260 to about 275° C. and preferably from about 265 to about 270° C.

Comparative Examples A-H utilized too much endcap. Examples 1 and 2 were successful because the mole ratio of phthalic anhydride endcap was between 0.03 and 0.05.

Examples 3,4, and 5 introduced BAPP, 1,3,4'-APB, and Bisaniline-M, respectively as a second diamine, with success. Yet, Comparative Example I using 1,3,3'-APB as a second diamine in the same molar ratio as the other three was a complete failure. To confirm that failure, the experiment was repeated with the same unexplainable unexpected result.

Comparative Examples J, K, L, and M and Example 6 demonstrated that the molar ratio of the 3,4'-ODA to the molar ratio 1,3,4'-APB needed to be at least 0.9:0.1 in order to perform the reactive extrusion process within acceptable torque ranges.

Examples 7 and 8 explored different molar ratios of a-BPDA and phthalic anhydride after the minimum molar ratio of 3,4'-ODA to 1,3,4'-APB was established in Example 6. Example 8 resulted in not only filaments suitable for 3D printing, but also the filament was used to make 3D printed plastic articles, objects resembling the shape of a USA five cent piece, having a glass transition temperature greater than 220° C.

The IUPAC names and formulae, respectively, for four new polyimides I-IV are as follows:

New Polyimide I:
Poly (2-{4-[3-(1,3-dioxo-2,3-dihydro-1H-isoindol-2-yl) phenoxy]phenyl}-5-(2-{3-[4-(1,3-dioxo-2,3-dihydro-1H-isoindol-2-yl)phenoxy]phenyl}-1,3-dioxo-2,3-dihydro-1H-isoindol-4-yl)-2,3-dihydro-1H-isoindole-1,3-dione)

New Polyimide II:
Poly (5-{2-[3-(4-{5-[2-(4-{3-[4-(1,3-dioxo-2,3-dihydro-1H-isoindol-2-yl)phenoxy]phenoxy}phenyl)-1,3-dioxo-2,3-dihydro-1H-isoindol-4-yl]-1,3-dioxo-2,3-dihydro-1H-isoindol-2-yl}phenoxy)phenyl]-1,3-dioxo-2,3-dihydro-1H-isoindol-4-yl}-2-{4-[3-(1,3-dioxo-2,3-dihydro-1H-isoindol-2-yl)phenoxy]phenyl}-2,3-dihydro-1H-isoindole-1,3-dione)

New Polyimide III:
Poly (2-{4-[3-(1,3-dioxo-2,3-dihydro-1H-isoindol-2-yl) phenoxy]phenyl}-5-[2-(3-{4-[5-(2-{4-[4-(2-{4-[4-(1,3-dioxo-2,3-dihydro-1H-isoindol-2-yl)phenoxy] phenyl}propan-2-yl)phenoxy]phenyl}-1,3-dioxo-2,3-dihydro-1H-isoindol-4-yl)-1,3-dioxo-2,3-dihydro-1H-isoindol-2-yl]phenoxy}phenyl)-1,3-dioxo-2,3-dihydro-1H-isoindol-4-yl]-2,3-dihydro-1H-isoindole-1,3-dione)

New Polyimide IV:
Poly (2-{4-[3-(1,3-dioxo-2,3-dihydro-1H-isoindol-2-yl) phenoxy]phenyl}-5-[2-(3-{4-[5-(2-{4-[2-(3-{2-[4-(1,3-dioxo-2,3-dihydro-1H-isoindol-2-yl)phenyl]propan-2-yl}phenyl)propan-2-yl]phenyl}-1,3-dioxo-2,3-dihydro-1H-isoindol-4-yl)-1,3-dioxo-2,3-dihydro-1H-isoindol-2-yl]phenoxy}phenyl)-1,3-dioxo-2,3-dihydro-1H-isoindol-4-yl]-2,3-dihydro-1H-isoindole-1,3-dione).

New Polyimide I:

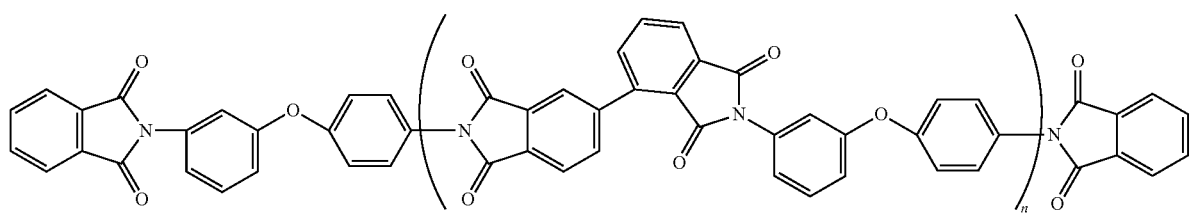

where n is a number from about 30 to about 70 and preferably from about 40 to about 65.

New Polyimide II:

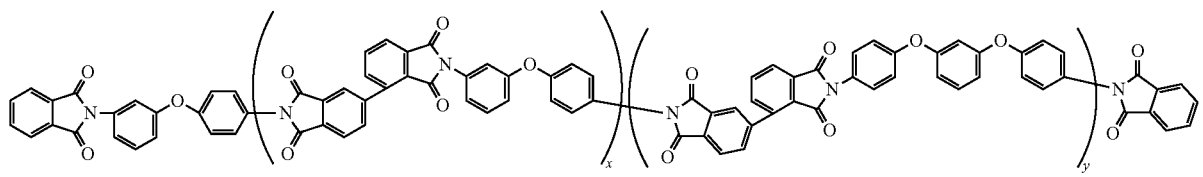

where x is a number from about 3 to about 7 and preferably from about 4 to about 6 and y is a number from about 27 to about 63 and preferably from about 36 to about 59.

New Polyimide III:

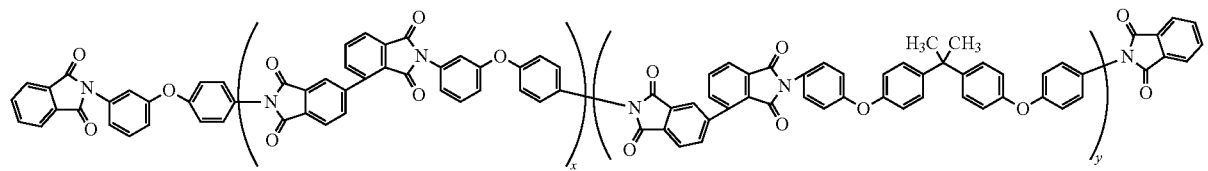

where x is a number from about 3 to about 7 and preferably from about 4 to about 6 and y is a number from about 27 to about 63 and preferably from about 36 to about 59.

New Polyimide IV:

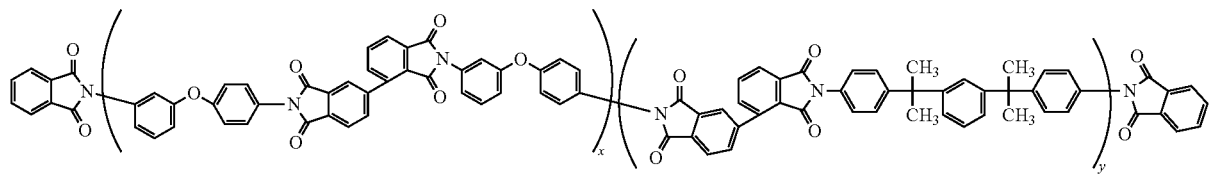

where x is a number from about 3 to about 7 and preferably from about 4 to about 6 and y is a number from about 27 to about 63 and preferably from about 36 to about 59.

The invention is not limited to above embodiments. The claims follow.

What is claimed is:

1. An aromatic polyimide which is a
reaction product of
   (1) 3,4'-oxydianiline (3,4' ODA);
   (2) 4,4'-[1,3-phenylenebis(1-methyl-ethylidene)bisaniline (Bisaniline-M);
   (3) 2,3,3',4'-biphenyldianhydride (a-BPDA); and
   (4) phthalic anhydride in a molar ratio of 0.9:0.1:0.975: 0.05;
wherein the reaction product is in a shape of a filament sufficiently ductile to form a loop of about 64 cm in circumference.

2. The aromatic polyimide of claim 1 in the shape of the filament, wherein the aromatic polyimide has a glass transition temperature of more than 220° C. and ductility to be wound in the shape of the filament of about 2 mm diameter around a spool having a diameter of 8 inches (20.32 cm).

3. The aromatic polyimide of claim 2 in the shape of the filament, wherein the polyimide has a glass transition temperature ranging from about 260 to about 275° C.

4. The aromatic polyimide of claim 2 in the shape of the filament, wherein the polyimide has a glass transition temperature ranging from about 265 to about 270° C.

5. The aromatic polyimide of claim 2 in the shape of the filament, wherein the aromatic polyimide is sufficiently ductile in a length of about 38 cm to be bent upon itself, such that opposing ends of that length of filament can touch each other.

6. The aromatic polyimide of claim 5, in the shape of the filament wherein the filament has a diameter ranging from about 1.6 to about 2.1 mm.

7. The aromatic polyimide of claim 2 in the shape of the filament, wherein the aromatic polyimide is prepared by solvent-less reactive extrusion.

8. The aromatic polyimide of claim 7 in the shape of the filament, wherein the aromatic polyimide is prepared by concurrent solvent-less reactive extrusion.

9. The aromatic polyimide of claim 1 in the shape of the filament, wherein the polyimide has a glass transition temperature ranging from about 260 to about 275° C.

10. The aromatic polyimide of claim 1 in the shape of the filament, wherein the aromatic polyimide reaction product is sufficiently ductile in a length of about 38 cm to be bent upon itself, such that opposing ends of that length of filament can touch each other.

11. A composite in the shape of the filament comprising the aromatic polyimide of claim 1.

12. A composite in the shape of the filament comprising the aromatic polyimide of claim 2.

13. The composite of claim 12, wherein the composite in the shape of the filament further includes carbon, glass, or synthetic fibers.

14. The composite in the shape of the filament of claim 13, wherein the composite is further in the form of a 3D printed article.

* * * * *